US008315759B2

(12) United States Patent
Bauerle (10) Patent No.: US 8,315,759 B2
(45) Date of Patent: Nov. 20, 2012

(54) HUMIDITY SENSOR DIAGNOSTIC SYSTEMS AND METHODS (75) Inventor: Paul A. Bauerle, Fenton, MI (US)

(73) Assignee: GM Global Technology Operations LLC ( * ) Notice: Subject to any disclaimer, the term of this patent is extended or adjusted under 35 U.S.C. 154(b) by 1184 days.

(21) Appl. No.: 12/115,764

(22) Filed: May 6, 2008

(65) Prior Publication Data
US 2009/0254245 A1 Oct. 8, 2009

Related U.S. Application Data (60) Provisional application No. 61/042,446, filed on Apr. 4, 2008.

(51) Int. Cl.
G07C 5/00 (2006.01)
(52) U.S. Cl. ........................ 701/30.5; 701/32.4; 123/677
(58) Field of Classification Search .................. 701/29, 701/33, 34, 213; 123/677, 678, 679, 680
See application file for complete search history.

(56) References Cited

U.S. PATENT DOCUMENTS

| 5,617,337 | A | * | 4/1997 | Eidler et al. | 702/104 |
|---|---|---|---|---|---|
| 6,240,365 | B1 | * | 5/2001 | Bunn | 701/213 |
| 6,405,106 | B1 | * | 6/2002 | Sheth et al. | 701/1 |
| 6,581,370 | B2 | * | 6/2003 | Sato et al. | 60/277 |
| 6,732,031 | B1 | * | 5/2004 | Lightner et al. | 701/33 |
| 6,738,697 | B2 | * | 5/2004 | Breed | 701/29 |
| 6,772,586 | B2 | * | 8/2004 | Miyahara et al. | 60/277 |
| 7,195,009 | B2 | * | 3/2007 | Cullen | 123/690 |
| 7,318,409 | B2 | * | 1/2008 | Cullen | 123/399 |
| 7,398,775 | B2 | * | 7/2008 | Cullen | 123/677 |
| 7,409,275 | B2 | * | 8/2008 | Sakurai et al. | 701/31 |
| 7,463,960 | B2 | * | 12/2008 | Thiel et al. | 701/34 |
| 7,532,963 | B1 | * | 5/2009 | Lowrey et al. | 701/29 |
| 7,650,211 | B2 | * | 1/2010 | Wang et al. | 701/34 |
| 7,654,253 | B2 | * | 2/2010 | Cullen | 123/690 |
| 7,715,976 | B1 | * | 5/2010 | Xiao et al. | 701/108 |
| 2004/0230345 | A1 | * | 11/2004 | Tzamaloukas | 701/1 |
| 2005/0072411 | A1 | * | 4/2005 | Cullen | 123/690 |
| 2007/0005609 | A1 | * | 1/2007 | Breed | 707/10 |
| 2007/0100519 | A1 | * | 5/2007 | Engel | 701/33 |
| 2007/0181111 | A1 | * | 8/2007 | Cullen | 123/677 |
| 2008/0189009 | A1 | * | 8/2008 | Wang et al. | 701/34 |
| 2008/0270012 | A1 | * | 10/2008 | Cullen | 701/114 |
| 2008/0316006 | A1 | * | 12/2008 | Bauman et al. | 340/425.5 |

* cited by examiner

Primary Examiner — Darnell Jayne
Assistant Examiner — Joshua Rodden (57) ABSTRACT A diagnostic system for a vehicle comprises a humidity module and a fault diagnostic module. The humidity module outputs a first humidity value based on a humidity measurement of a humidity sensor of the vehicle and outputs a second humidity value based on humidity data from a data source that is external to the vehicle. The fault diagnostic module selectively diagnoses a fault in the humidity sensor based on the first humidity value and the second humidity value.

12 Claims, 9 Drawing Sheets

HUMIDITY SENSOR DIAGNOSTIC SYSTEMS AND METHODS

CROSS-REFERENCE TO RELATED APPLICATIONS

This application claims the benefit of U.S. Provisional Application No. 61/042,446, filed on Apr. 4, 2008. The disclosure of the above application is incorporated herein by reference.

FIELD

The present disclosure relates to vehicles and more particularly control systems and methods for internal combustion engines.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Figure 1:
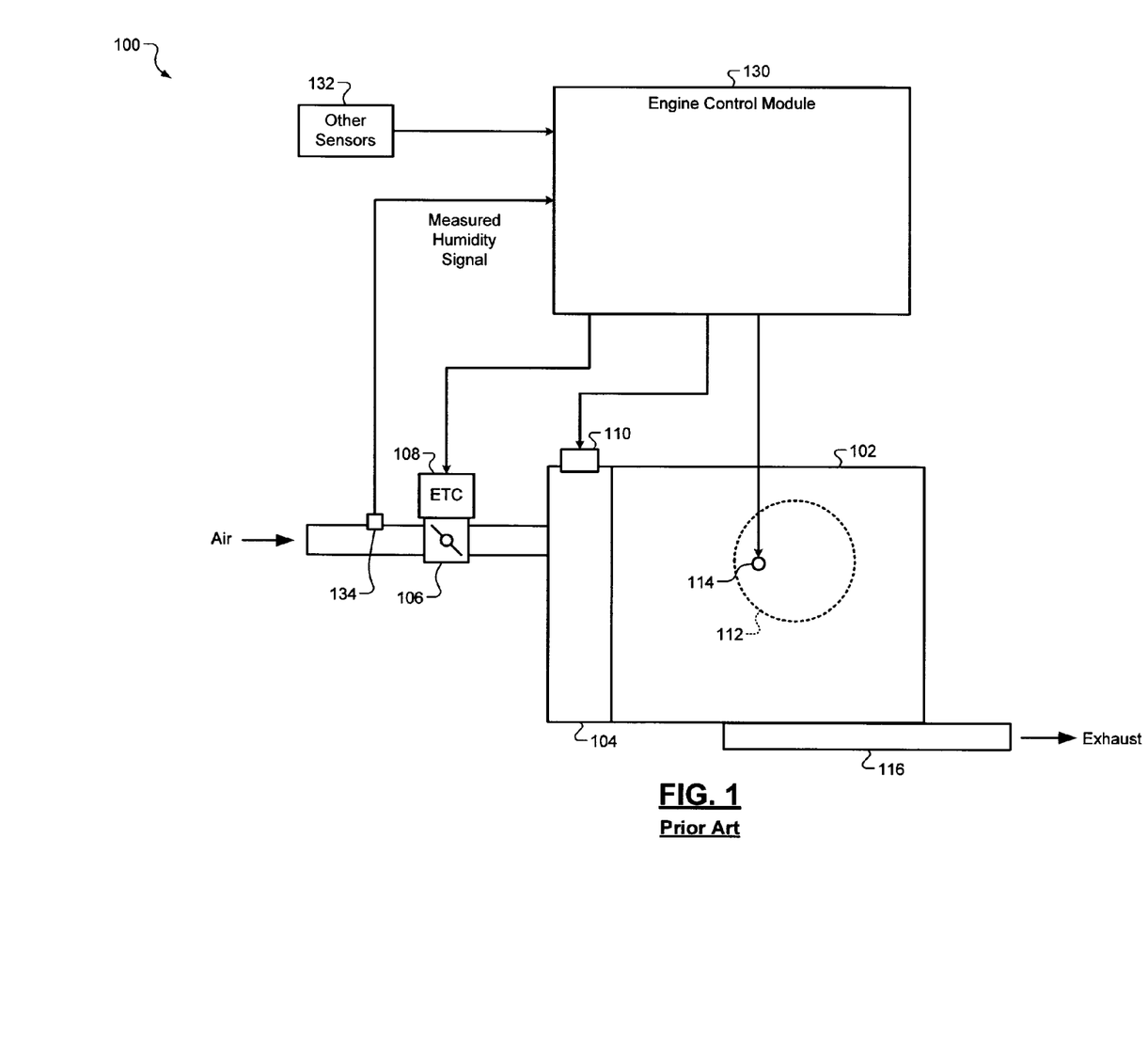
FIG. 1 is a functional block diagram of an engine system according to the prior art.

Referring now to FIG. 1, a functional block diagram of an engine system 100 is presented. Air is drawn into an engine 102 through an intake manifold 104. A throttle valve 106 varies airflow into the intake manifold 104. An electronic throttle controller (ETC) 108 actuates the throttle valve 106, thereby controlling opening of the throttle valve 106.

The air mixes with fuel provided by a fuel injector 110 to form an air and fuel mixture. The air/fuel mixture is combusted within cylinders of the engine 102, such as cylinder 112. Combustion may be initiated by, for example, a spark from a spark plug 114. Exhaust gas resulting from combustion is expelled from the cylinder 112 to an exhaust system 116. Combustion of the air/fuel mixture generates torque.

An engine control module (ECM) 130 controls torque output by the engine 102. For example, the ECM 130 adjusts torque output by the engine by adjusting the opening of the throttle valve 106, the amount of fuel injected by the fuel injector 110, and/or the timing of the spark provided by the spark plug 114.

The ECM 130 may adjust the torque output by the engine 102 based on signals provided by various sensors that measure various engine parameters at locations throughout the engine system 100. For example, the ECM 130 receives signals from other sensors 132, which may include, an intake air temperature (IAT) sensor, a mass air flow (MAF) sensor, a manifold absolute pressure (MAP) sensor, an engine coolant temperature sensor (ECT), an oil temperature sensor (OT) and/or any other suitable sensor. Additionally, the ECM 130 may adjust torque output by the engine 102 based on a humidity signal from a humidity sensor 134 that measures humidity of air. For example only, the humidity sensor 134 measures humidity of the air drawn into the engine 102.

SUMMARY

A diagnostic system for a vehicle comprises a humidity module and a fault diagnostic module. The humidity module outputs a first humidity value based on a humidity measurement of a humidity sensor of the vehicle and outputs a second humidity value based on humidity data from a data source that is external to the vehicle. The fault diagnostic module selectively diagnoses a fault in the humidity sensor based on the first humidity value and the second humidity value.

In other features, the diagnostic system further comprises a global positioning system (GPS) and a communication module. The GPS system monitors location of the vehicle. The communication module transmits the vehicle location to the data source and receives the humidity data from the data source.

In further features, the humidity data corresponds to an estimate of the humidity based on the vehicle location.

In other features, the humidity data corresponds to an estimate of the humidity based on a second location that is determined based on the vehicle location.

In still other features, the diagnostic system further comprises a receiver module that receives a predetermined type of signal, wherein the humidity data is carried with the signal.

In further features, the signal is transmitted over a predetermined range and the vehicle is located within the range.

In still further features, the type of the signal is one of radio, cellular, wifi, and television.

In other features, the fault diagnostic module diagnoses the fault when a difference between the first and second humidity values is greater than a first predetermined value.

In still other features, the diagnostic system further comprises a disable module. The disable module prevents the fault diagnostic module from diagnosing the fault when the second humidity value is equal to a second predetermined value.

A method comprises providing a first humidity value based on a humidity measurement of a humidity sensor of the vehicle, providing a second humidity value based on humidity data from a data source that is external to the vehicle, and selectively diagnosing a fault in the humidity sensor based on the first humidity value and the second humidity value.

In other features, the method further comprises monitoring location of the vehicle and transmitting the vehicle location to the data source.

In further features, the humidity data corresponds to an estimate of the humidity based on the vehicle location.

In still further features, the humidity data corresponds to an estimate of the humidity based on a second location that is determined based on the vehicle location.

In other features, the method further comprises receiving a predetermined type of signal, wherein the humidity data is carried with the signal.

In further features, the signal is transmitted over a predetermined range and the vehicle is located within the range.

In still further features, the type of the signal is one of radio, cellular, wifi, and television.

In other features, the method further comprises diagnosing the fault when a difference between the first and second humidity values is greater than a first predetermined value.

In still further features, the method further comprises preventing the diagnosis when the second humidity value is equal to a second predetermined value.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

The following description is merely exemplary in nature and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical or. It should be understood that steps within a method may be executed in different order without altering the principles of the present disclosure.

As used herein, the term module refers to an Application Specific Integrated Circuit (ASIC), an electronic circuit, a processor (shared, dedicated, or group) and memory that execute one or more software or firmware programs, a combinational logic circuit, and/or other suitable components that provide the described functionality.

An engine controller adjusts various engine parameters based on humidity of air measured by a humidity sensor. In some circumstances, however, the humidity sensor may become unreliable or faulty. Adjusting engine parameters based on humidity measured by a faulty humidity sensor may cause inconsistent torque output and/or may decrease a vehicle's fuel efficiency.

The engine controller according to the present disclosure diagnoses occurrence of a fault in the humidity sensor. More specifically, the engine controller obtains an estimated humidity of the air from a remote data source and diagnoses a fault in the humidity sensor based on a comparison of the measured humidity with the estimated humidity.

Referring now to FIGS. 2A-2E, functional block diagrams of exemplary engine systems are presented. Engine systems include the engine 102 that combusts an air/fuel mixture to produce drive torque. Air is drawn into the intake manifold 104 through the throttle valve 106. The electronic throttle controller (ETC) 108 controls the opening of the throttle valve 106.

An engine control module (ECM) 230 regulates opening of the throttle valve 106 via the ETC 108. In this manner, the ECM 230 controls the airflow into the intake manifold 104. Air from the intake manifold 104 is drawn into cylinders of the engine 102. While the engine 102 may include multiple cylinders, for illustration purposes only, the representative cylinder 112 is shown. For example only, the engine 102 may include 2, 3, 4, 5, 6, 8, 10, and/or 12 cylinders.

The ECM 230 also controls the amount of fuel injected by the fuel injector 110. For example, the ECM 230 may generate a pulse for a predetermined period of time. The fuel injector 110 may open while the pulse is generated. Accordingly, the amount of fuel injected by the fuel injector 110 may be adjusted based on the length of the pulse (i.e., the pulse width). The fuel injector 110 may inject fuel into the intake manifold 104 at a central location or at multiple locations, such as near an intake valve that is associated with the cylinder 112. Alternatively, the fuel injector 110 may inject fuel directly into the cylinders. In various implementations, one fuel injector is provided for each cylinder.

The injected fuel mixes with the air and creates the air/fuel mixture. A piston (not shown) compresses the air/fuel mixture within the cylinder 112. The spark plug 114 is energized, thereby igniting the air/fuel mixture. While the engine 102 is shown as including the spark plug 114, the engine 102 may be any suitable type of engine, such as a compression combustion type engine or a hybrid type engine. In other engine systems, the spark plug 114 may not be necessary to initiate combustion. The byproducts of combustion (i.e., exhaust gas) are expelled from the cylinder 112 to the exhaust system 116.

The ECM 230 regulates the torque output by the engine 102 based on signals from various sensors. For example, the ECM 230 may regulate torque output by the engine 102 based on signals from the other sensors 132. For example only, the other sensors 132 may include an intake air temperature (IAT) sensor, a mass airflow (MAF) sensor, a manifold absolute pressure (MAP) sensor, an engine coolant temperature (ECT) sensor, an oil temperature (OT) sensor, and/or any other suitable sensor. Additionally, the ECM 230 may regulate torque output by the engine 102 based on a measured humidity signal provided by the humidity sensor 134.

The humidity sensor 134 measures humidity of air and generates the measured humidity signal accordingly. For example only, the humidity sensor 134 may measure humidity of the air drawn into the engine 102. While the humidity sensor 134 is depicted as being located upstream of the throttle valve 106, the humidity sensor 134 may be located at any suitable location. In various implementations, the humidity sensor 134, the MAF sensor, and/or any other suitable sensor may be included within a common packaging.

The ECM 230 may adjust the torque output by the engine 102 by adjusting one or more engine parameters. For example only, the ECM 230 may adjust the torque output of the engine 102 by adjusting the opening of the throttle valve 106, the amount of fuel injected by the fuel injector 110, and/or the spark timing. The torque output of the engine 102 may be increased by, for example, increasing the opening of the throttle valve 106.

The ECM 230 also performs diagnostics of one or more of the sensors of the vehicle. The ECM 230 according to the present application includes a humidity sensor diagnostic module 240 that selectively diagnoses occurrence of a fault in the humidity sensor 134. More specifically, the humidity sensor diagnostic module 240 diagnoses a fault based on the measured humidity signal and a remote humidity signal. The remote humidity signal corresponds to an estimated humidity of air at the vehicle location. While the humidity sensor diagnostic module 240 is depicted as being located within the ECM 230, the humidity sensor diagnostic module 240 may be external to the ECM 230.

Humidity data (i.e., remote humidity data) may be obtained in a variety of different manners from a variety of wireless sources. For example only, the vehicle location may be transmitted to a data source and the data source may return remote humidity data based on the vehicle location. In other implementations, remote humidity data may be retrieved from a signal transmitted in the area of the vehicle, such as a radio signal, a television signal, a cellular signal, a wifi signal, and/or any other suitable signal.

Figure 2A:
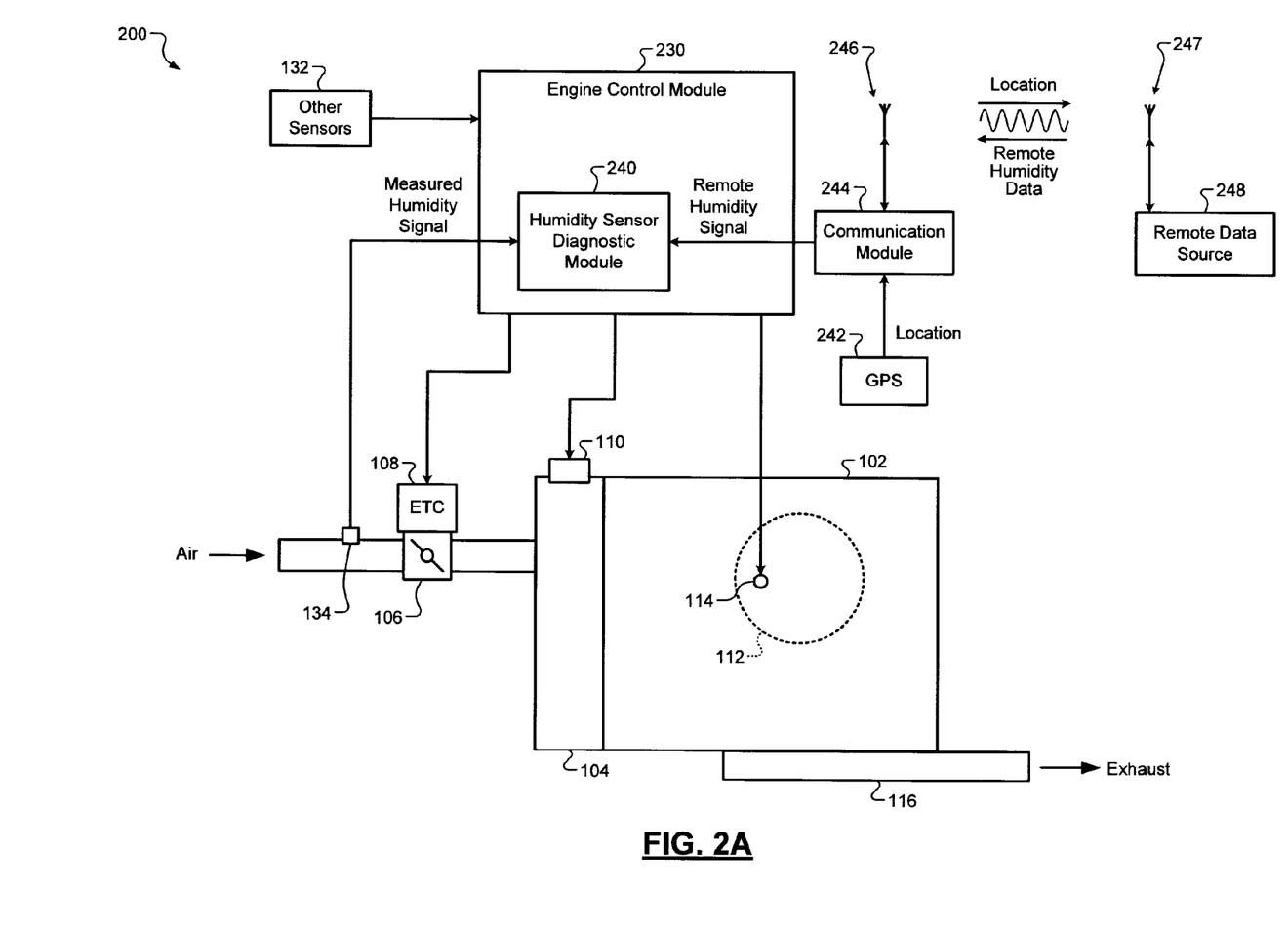
FIGS. 2A-2E are a functional block diagrams of exemplary engine systems according to the principles of the present disclosure.

Referring to FIG. 2A, engine system 200 includes a global positioning system (GPS) 242, a communication module 244, and an antenna 246. The GPS 242 monitors location of the vehicle and outputs the vehicle location to the communication module 244. For example only, the GPS 242 may determine the vehicle location based on data provided by a satellite system. The vehicle location may be, for example, a zip code, a county, an address, a coordinate (e.g., longitude and latitude), and/or any other suitable locational parameter. The GPS 242 may also monitor other parameters, such as vehicle speed, direction of travel, and/or time.

The communication module 244 transmits the vehicle location to a remote data source 248 via the antenna 246. The remote data source 248 receives the vehicle location via another (remote) antenna 247. The remote data source 248 may be any suitable source of humidity or a system having access to humidity data, such as an Onstar system. The remote data source 248 retrieves humidity data (i.e., remote humidity data) for the vehicle location from any suitable source of humidity data, such as the Internet. This humidity data will be referred to as remote humidity data.

The remote humidity data corresponds to an estimated humidity of air at the vehicle location. In various implementations, the remote humidity data may be data regarding humidity of the air measured near or at the vehicle location. In other implementations, the remote humidity data may be humidity of air at a location nearest to the vehicle location at which humidity data is available or may be estimated based on this humidity.

The remote data source 248 transmits the remote humidity data to the engine system 200 via the antennas 246 and 247. The communication module 244 receives the remote humidity data and provides the remote humidity signal to the humidity sensor diagnostic module 240. The humidity sensor diagnostic module 240 then performs the diagnostic of the humidity sensor 134 based on the remote humidity signal. In various implementations, transmission of the vehicle location and the receipt of the remote humidity data may be once per key cycle (e.g., key ON to key OFF) or may be continuous while the engine 102 is operated.

Referring to FIGS. 2B-2E, functional block diagrams of exemplary engine systems are presented. In some engine systems, the remote humidity signal may be provided to the humidity sensor diagnostic module 240 without the transmission of the vehicle location. The remote humidity data may be carried on one or more signals that are transmitted to the location of the vehicle. For example, a radio signal, a television signal, a cellular signal, a wifi signal, and/or any other suitable signal may be transmitted generally over predetermined area. Humidity data may be carried on, for example, a side band or a predetermined channel of such a transmitted signal.

Figure 2B:
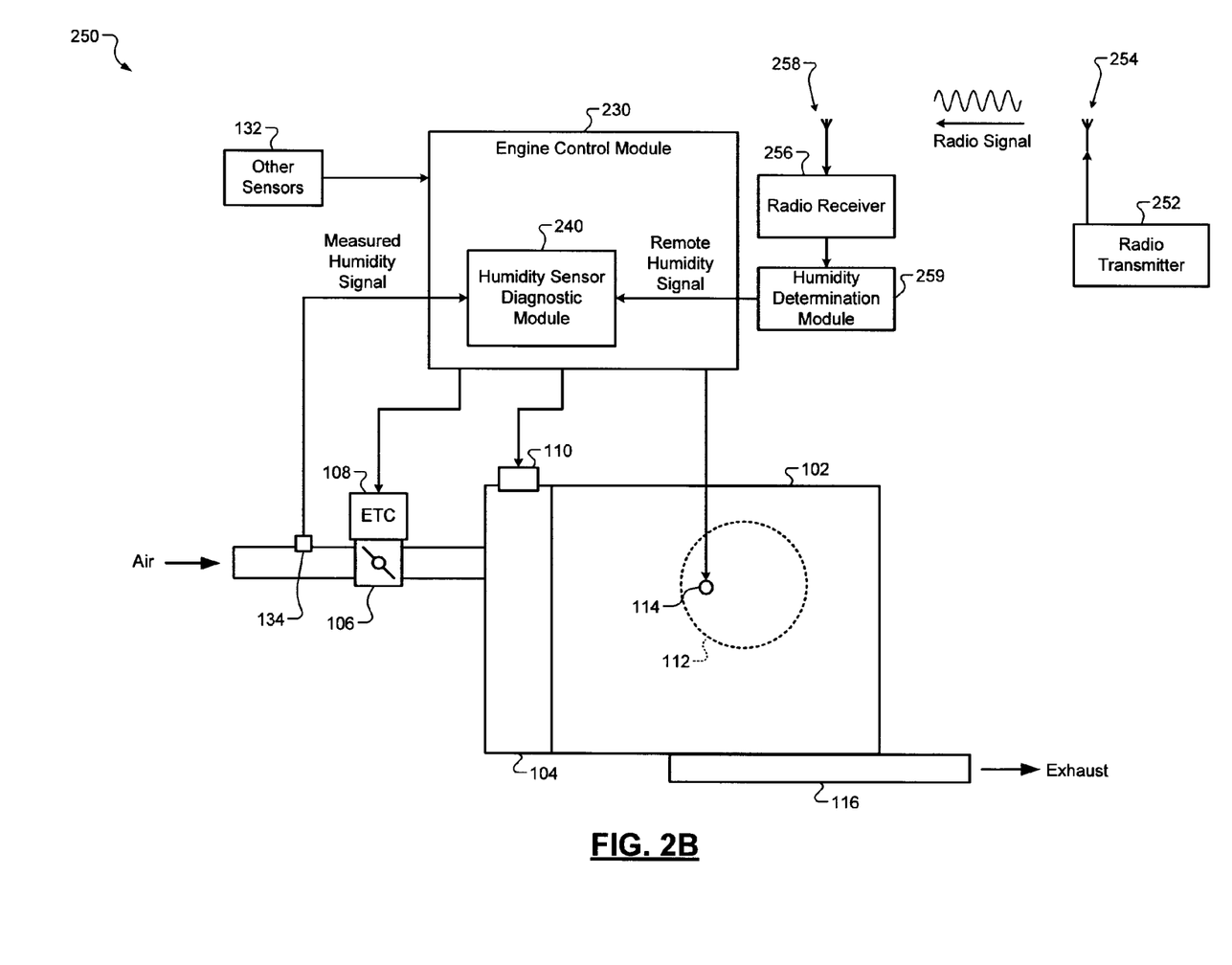

Referring to FIG. 2B, a functional block diagram of an engine system 250 is presented. A radio transmitter 252 transmits a radio signal via an antenna 254. In various implementations, the radio transmitter 252 may be a fixed radio transmission device, such as a tower, and the radio signal may be transmitted to locations within a predetermined distance from the radio transmitter 252. In other implementations, the radio transmitter 252 may be satellite system (not shown). The radio signal may be a digital signal or an analog signal. Also, the radio signal may be a modulated signal, such as amplitude modulated (AM) signal, a frequency modulated (FM) signal, or any other suitable form of modulated signal.

The engine system 250 includes a radio receiver 256 that receives the radio signal via an antenna 258. Remote humidity data is carried on the radio signal, such as on a sideband or a predetermined channel of the radio signal. The remote humidity data may be humidity measured, for example, at the location of the radio transmitter 252 or at a location within the area over which the radio signal is transmitted. The other data may also carried with the radio signal, such as data as to the author, title, and/or name.

A humidity determination module 259 receives the radio signal and retrieves the remote humidity data from the radio signal. In other implementations, the radio receiver 256 may transmit the remote humidity data to the humidity determination module 259. The humidity determination module 259 generates the remote humidity signal based on the remote humidity data and transmits the remote humidity signal to the humidity sensor diagnostic module 240.

Figure 2C:
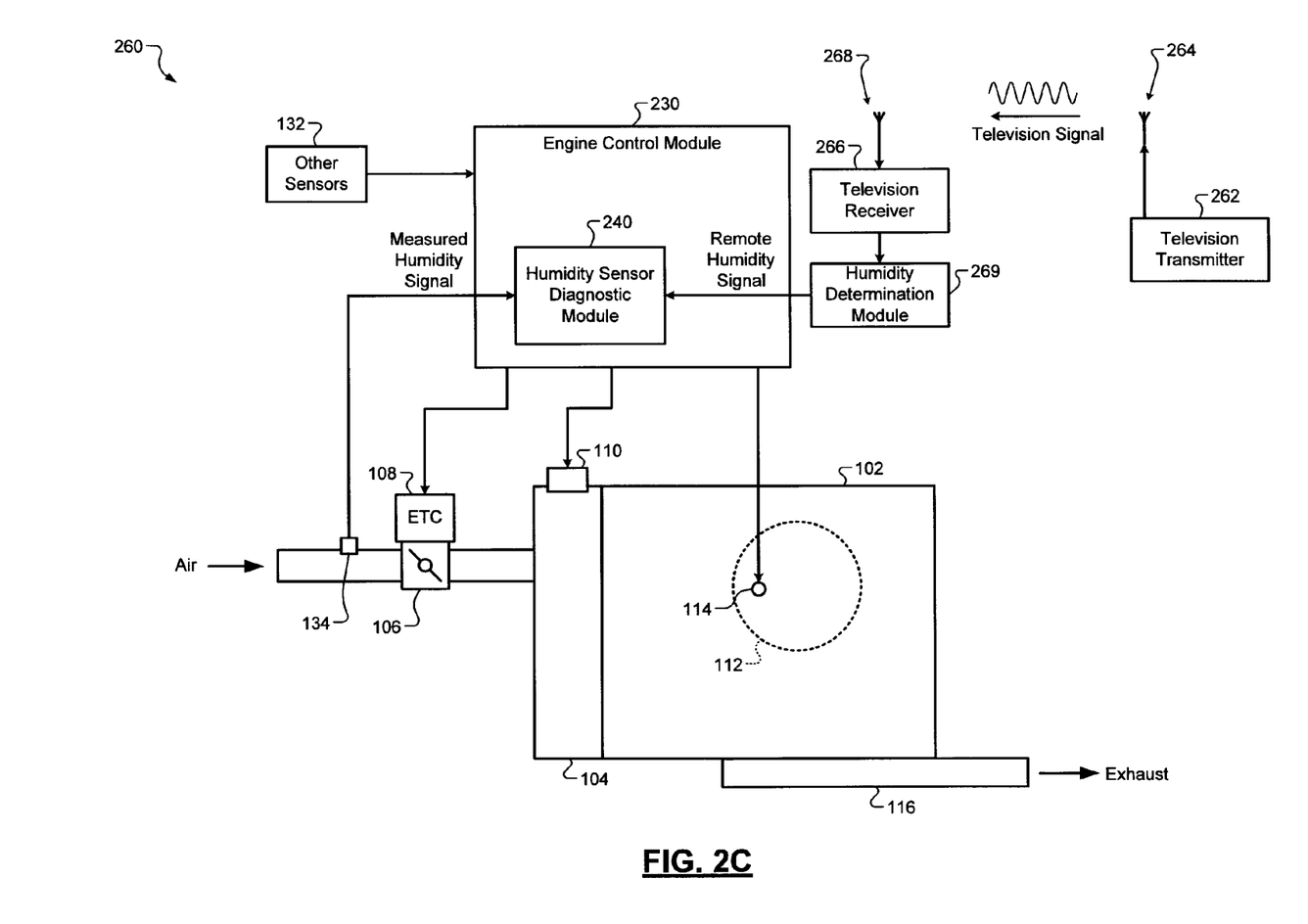

Referring now to FIG. 2C, a functional block diagram of an engine system 260 is presented. A television transmitter 262 transmits a television signal via an antenna 264. In various implementations, the television transmitter 262 may be a fixed television transmission device, such as a tower, and the television signal may be transmitted to locations within a predetermined distance from the television transmitter 262. In other implementations, the television transmitter 262 may be satellite system (not shown). The television signal may be a digital signal or an analog signal. Also, the television signal may be a modulated signal.

The engine system 260 includes a television receiver 266 that receives the television signal via an antenna 268. Remote humidity data is carried on the television signal, such as on a sideband or a predetermined channel of the television signal. The remote humidity data may be humidity measured, for example, at the location of the television transmitter 262 or at a location within the area over which the television signal is transmitted.

A humidity determination module 269 receives the television signal and retrieves the remote humidity data from the television signal. In other implementations, the television receiver 266 may transmit the remote humidity data to the humidity determination module 269. The humidity determination module 269 generates the remote humidity signal based on the remote humidity data and transmits the remote humidity signal to the humidity sensor diagnostic module 240.

Figure 2D:
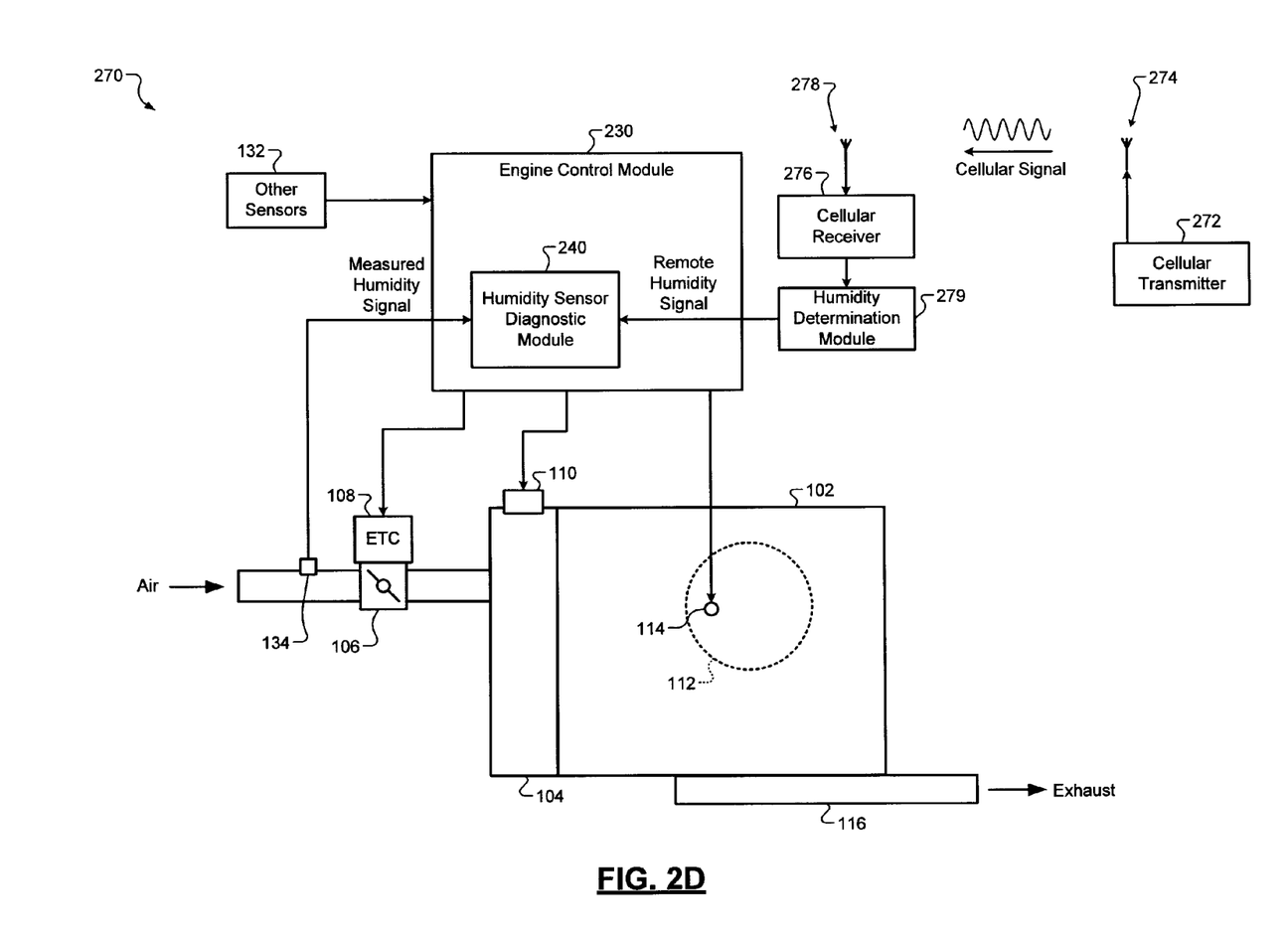

Referring now to FIG. 2D, a functional block diagram of another exemplary engine system 270 is presented. A cellular transmitter 272 transmits a cellular signal via an antenna 274. The cellular transmitter 272 may be a fixed transmission device, such as a tower, and the cellular signal may be transmitted to locations within a predetermined distance from the cellular transmitter 272. The cellular signal may be a digital signal or an analog signal. Also, the cellular signal may be modulated.

The engine system 270 includes a cellular receiver 276 that receives the cellular signal via an antenna 278. Remote humidity data and other data may be carried on the cellular signal. For example, the remote humidity data may be carried on a side band of the cellular signal or a predetermined channel of the cellular signal. The remote humidity data may correspond to humidity measured at, for example, the location of the cellular transmitter 272 or any suitable location within the area over which the cellular signal is transmitted. The cellular signal may be used by other vehicle systems for, for example, telephony, telematics, and/or any other suitable use.

The cellular receiver 276 may provide the cellular signal to a humidity determination module 279. The humidity determination module 279 retrieves the remote humidity data from the cellular signal. The humidity determination module 279 then transmits the remote humidity signal to the humidity sensor diagnostic module 240. In other implementations, the cellular receiver 276 may provide the remote humidity data to the humidity determination module 279.

Figure 2E:
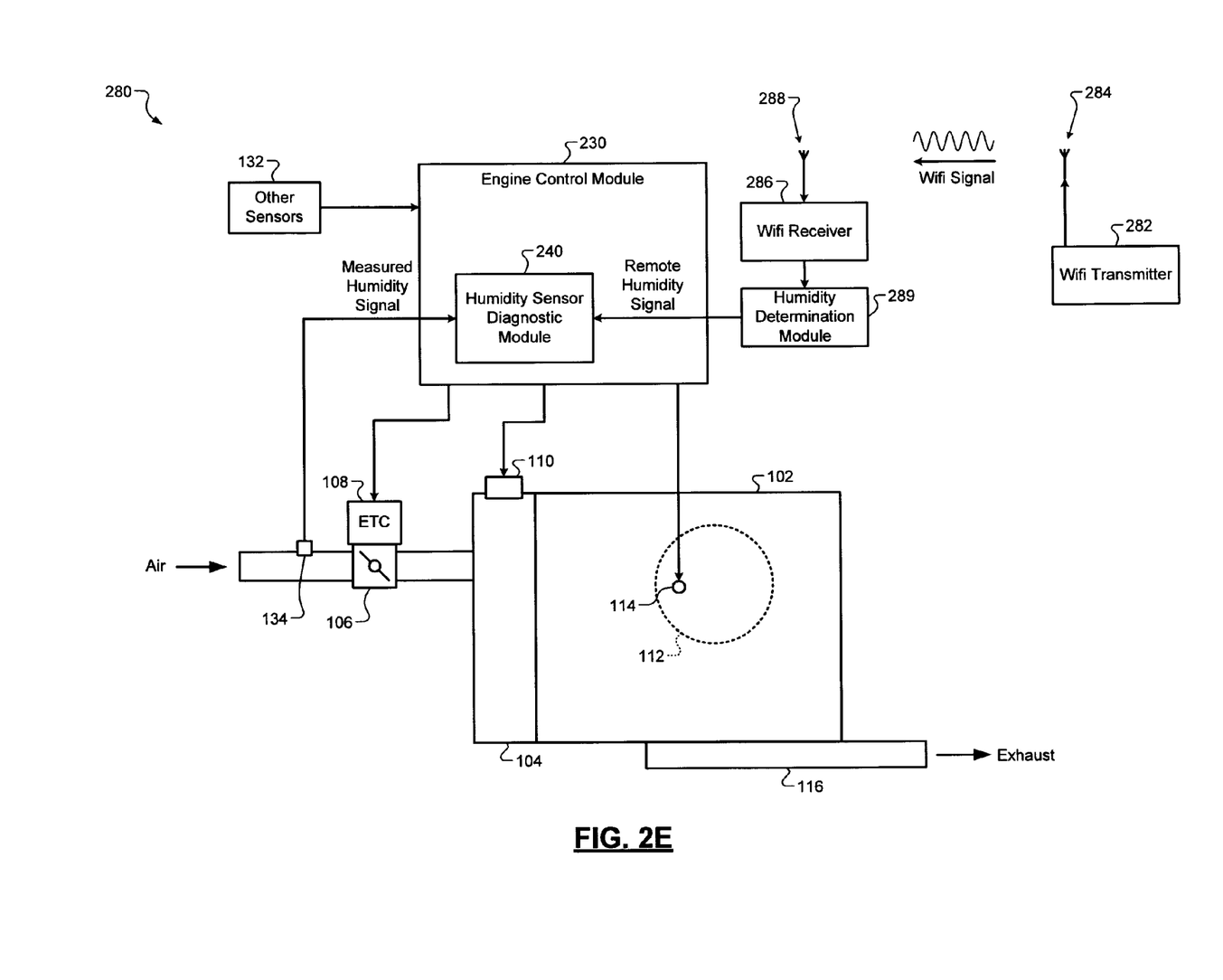

Referring to FIG. 2E, a functional block diagram of another exemplary engine system 280 is presented. A wifi signal (e.g., 802.11) may be transmitted by a wifi transmitter 282. The wifi transmitter 282 transmits the wifi signal via an antenna 284. Remote humidity data and other data may be carried on the wifi signal, such as on a predetermined channel of the wifi signal.

The engine system 280 includes a wifi receiver 286 that receives the wifi signal via an antenna 288. A humidity determination module 289 retrieves the remote humidity data from the wifi signal. In other implementations, the wifi receiver 286 may transmit the remote humidity data to the humidity determination module 289. The humidity determination module 289 generates the remote humidity signal based on the remote humidity data and transmits the remote humidity signal to the humidity sensor diagnostic module 240.

Figure 3:
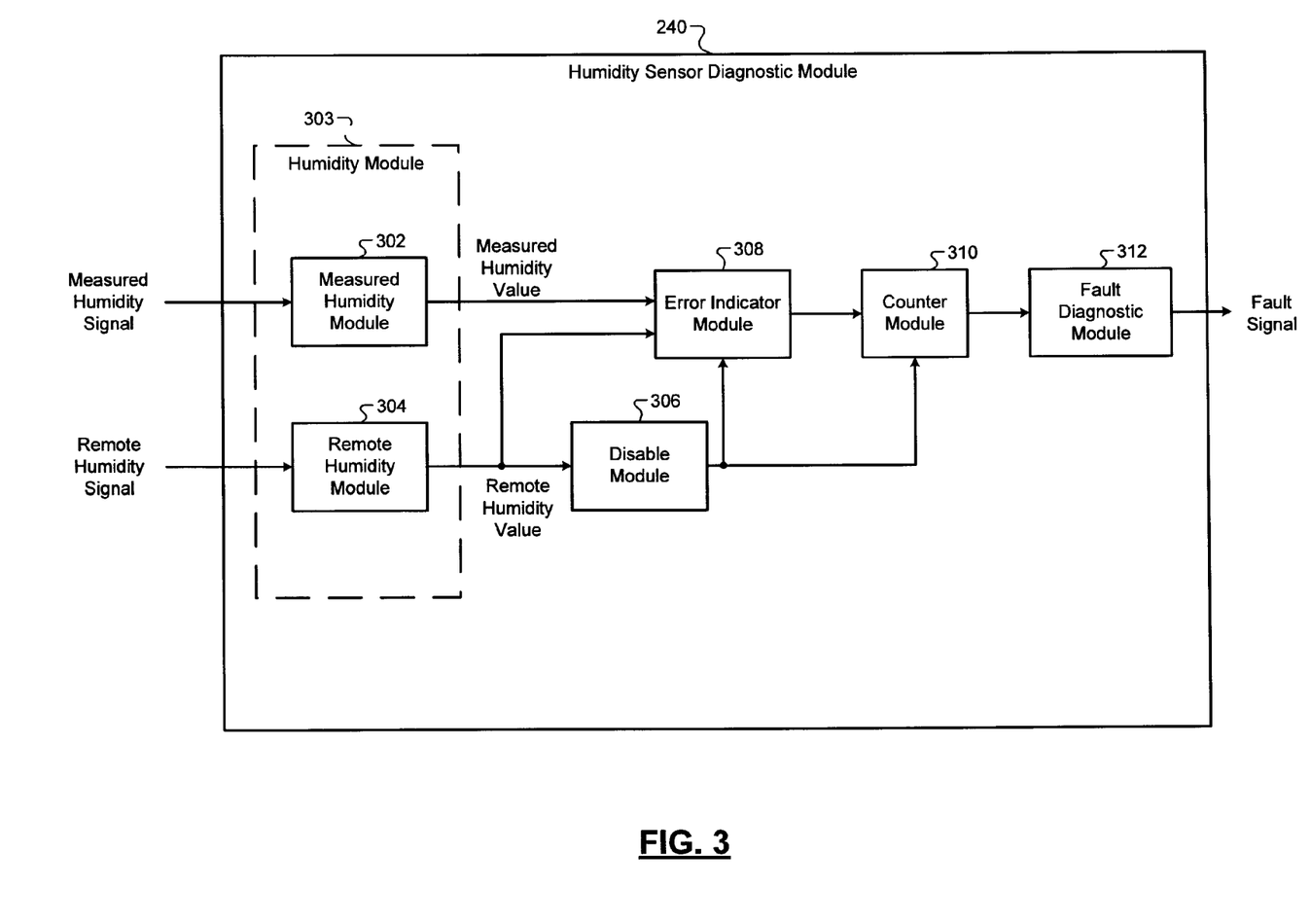
FIG. 3 is a functional block diagram of an exemplary implementation of a humidity sensor diagnostic module according to the principles of the present disclosure.

Referring now to FIG. 3, a functional block diagram of an exemplary implementation of the humidity sensor diagnostic module 240 is presented. The humidity sensor diagnostic module 240 includes a measured humidity module 302, a remote humidity module 304, a disable module 306, and an error indicator module 308. In various implementations, one or more of the modules may be combined within a single module or partitioned into one or more other modules. For example only, the measured humidity module 302 and the remote humidity module 304 may be combined and may be referred to as a humidity module 303.

The measured humidity module 302 receives the measured humidity signal from the humidity sensor 134 and provides a measured humidity value based on the measured humidity signal. The measured humidity module 302 may, for example, filter, buffer, and/or digitize the measured humidity signal. For example only, the measured humidity module 302 may digitize the measured humidity signal at a predetermined rate, such as once every 100.0 ms or once every 1.0 s. In this manner, the measured humidity module 302 may provide digital values that each correspond to a measured humidity of air. These digital values may be referred to as measured humidity values. While the principles of the present application will be discussed in terms of digital values, the principles of the present application are also applicable to analog signals.

The measured humidity module 302 may also apply a filter to the measured humidity values. For example only, the measured humidity module 302 may apply a first-order lag filter, which may be described as:

$$\text{Filtered Humidity} = \text{Out} + (\text{In} - \text{Out}) \times FC,$$

where Out is the previous output of the filter, In is the current input to the filter, and FC is the filter coefficient. The filter coefficient may be calibratable, and may be, for example, 0.1.

The remote humidity module 304 receives the remote humidity signal and may, for example, filter, buffer, and/or digitize the remote humidity signal. For example only, the remote humidity signal may generated based on data provided by the remote data source 248, the radio transmitter 252, the television transmitter 262, the cellular transmitter 272, the wifi transmitter 282, or any other suitable source.

Like the measured humidity module 302, the remote humidity module 304 may provide remote humidity values generated based on the remote humidity signal. For example only, the remote humidity module 304 may provide the remote humidity values at a predetermined rate, such as once every 100.0 ms or once every 1.0 s. Additionally, the remote humidity module 304 may apply a filter, such as the first-order lag filter described above.

As the remote humidity data is provided wirelessly to the vehicle. In some circumstances, the remote humidity signal may be delayed or lost. The disable module 306 determines whether the remote humidity signal has been lost (i.e., not present) based on a remote humidity value. More specifically, the disable module 306 determines whether the remote humidity signal has been lost based on a comparison of the remote humidity value with a predetermined lost value.

For example only, the predetermined lost signal value may correspond to a value which the remote humidity value will likely be when the remote humidity signal is lost, such as zero. Accordingly, the disable module 306 may determine that the remote humidity signal is lost when the remote humidity value is equal to the lost signal value. The disable module 306 generates a disable signal when the remote humidity signal is lost.

The error indicator module 308 indicates whether an error has occurred in the humidity sensor 134 based on a measured humidity value and the remote humidity value. More specifically, the error indicator module 308 selectively indicates whether an error has occurred based on a comparison of the measured humidity value with the remote humidity value. This error may be referred to as a correlation error.

The error indicator module 308 may determine a correlation value based on the magnitude of the difference between the measured and remote humidity values. Accordingly, the error indicator module 308 may calculate the correlation value using the equation:

$$\text{Correlation Value} = |\text{Measured Humidity Value} - \text{Remote Humidity Value}|$$

The error indicator module 308 may then determine whether a correlation error has occurred based on a comparison of the correlation value with a predetermined error value. For example, the error indicator module 308 may determine that a correlation error has occurred when the correlation value is greater than the error value. For example only, the error value may be calibratable, and may be set to a maximum allowable amount that may be experienced if the humidity sensor 134 is reliable (i.e., not faulty). The error indicator module 308 generates an error signal based on the comparison, which indicates whether a correlation error has occurred.

When the remote humidity signal is lost, the correlation value will likely be greater than the error value. Accordingly, the loss of the remote humidity signal will likely cause the error indicator module 308 to indicate that a correlation error has occurred. However, such a correlation error is likely attributable to the loss of the remote humidity signal and not to any fault of the humidity sensor 134. Accordingly, the disable module 306 may disable the error indicator module 308, via the disable signal, when the remote humidity signal is lost. In this manner, the disable module 306 prevents the error indicator module 308 from indicating that a correlation error has occurred when the remote humidity signal is lost.

The humidity sensor diagnostic module 240 also includes a counter module 310 and a fault diagnostic module 312. The counter module 310 includes an error counter that is incremented each time the error signal indicates that a correlation error has occurred. In this manner, the error counter tracks the number of correlation errors that have occurred.

The counter module 310 also includes a total counter which is incremented each time that the error signal is generated, regardless of whether a correlation error has occurred. In this manner, the total counter tracks the number of instances that both of the humidity values have been received. In other words, the total counter tracks the number of times that the error indicator module 308 has determined whether a correlation error has occurred. In other implementations, the total counter may be used to indicate how long the humidity sensor diagnostic has operated. More specifically, the period of time may be determined using the total counter (e.g., samples) and the period between the humidity values (e.g., time/sample).

Like the error indicator module 308, the counter module 310 may be disabled by the disable module 306 when the remote humidity signal is lost. In this manner, the disable module 306 prevents the error counter and the total counter from being incremented when the remote humidity signal is lost. Additionally, the total counter and/or the error counter may be reset when the counter module 310 is disabled. For example only, the total counter and/or the error counter may be reset to a predetermined reset value such as zero.

The fault diagnostic module 312 selectively diagnoses occurrence of a fault in the humidity sensor 134 based on total counter and/or the error counter. More specifically, the fault diagnostic module 312 diagnoses a fault in the humidity sensor 134 based on a comparison of the error counter with a predetermined fault value.

For example only, the fault diagnostic module 312 may diagnose a fault in the humidity sensor 134 when the error counter is greater than the fault value. The fault value may be calibratable, and may be determined and set based on, for example, the total counter. For example only, the fault value may be set equal to one-half of the total counter. In this manner, the fault diagnostic module 312 may indicate that a fault has occurred in the humidity sensor 134 when the error counter is greater than one-half of the total counter. The fault diagnostic module 312 generates a fault signal when a fault is diagnosed.

In various implementations, the fault diagnostic module 312 may wait to diagnose fault in the humidity sensor 134 until the total counter is equal to a predetermined total value. In various implementations, the total value may correspond to a predetermined period of time, such as 30.0 s. Accordingly, the predetermined value may be determined based on this period (e.g., time) and the known rate at which the humidity values are provided (e.g., samples/unit time). For example only, if the sampling rate is one sample (e.g., humidity value) every 100 ms, the total value may be 300 (i.e., 30 s*10 samples/s).

In other implementations, the fault diagnostic module 312 may diagnose a fault in the humidity sensor 134 without waiting for the total counter to reach the total value. In such implementations, the fault diagnostic module 312 may diagnose fault in the humidity sensor 134 once the error counter exceeds the fault value.

The fault diagnostic module 312 may transmit the fault signal to the ECM 230, which may take remedial action when a fault has occurred in the humidity sensor 134. For example only, when fault has occurred, the ECM 230 may control the engine 102 based upon a modeled value of the humidity, a secondary humidity sensor (not shown), and/or the remote humidity signal. The ECM 230 may also, for example, illuminate a "check engine light" and/or set a flag in memory when a fault has occurred.

Figure 4A:
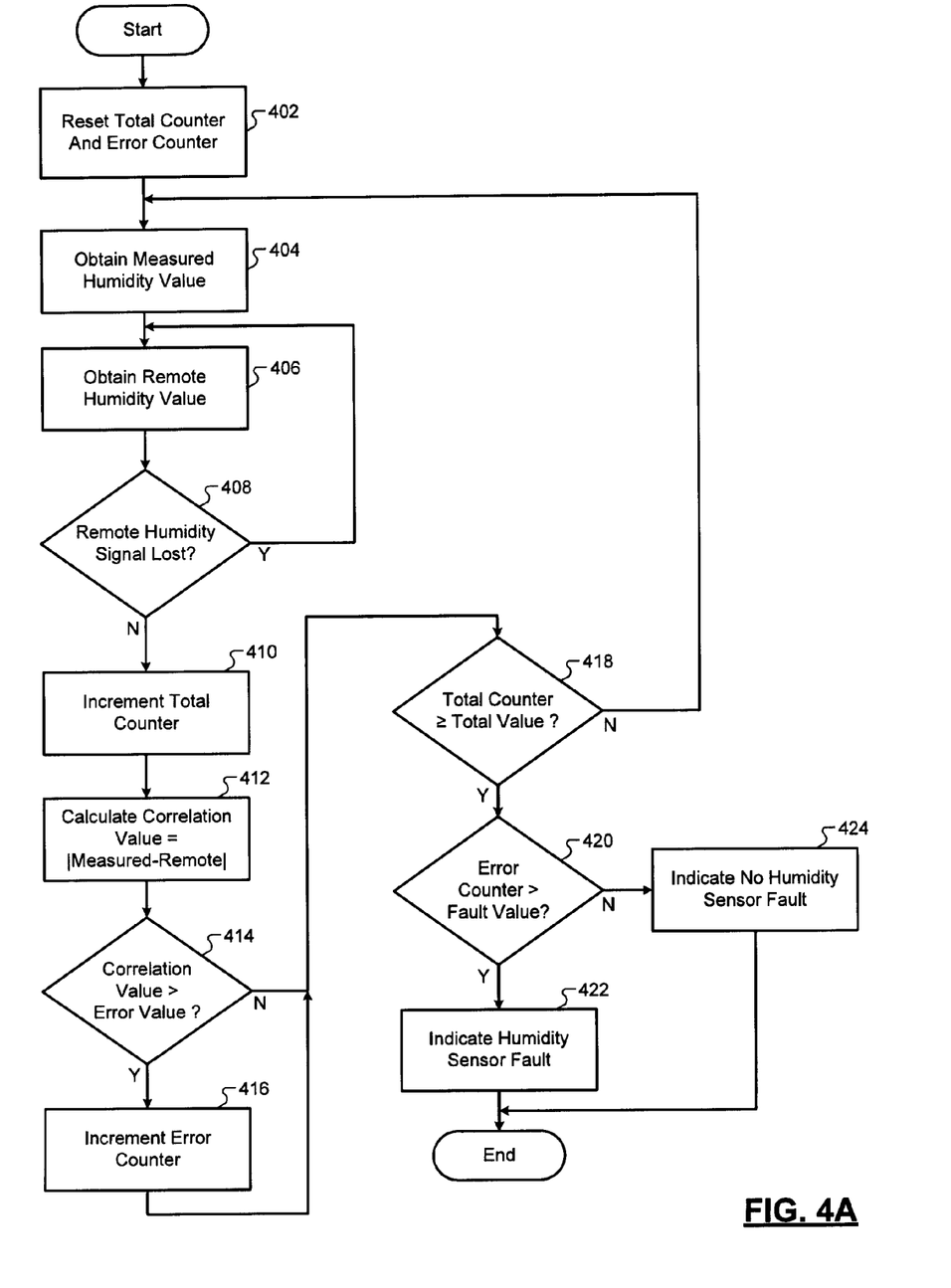
FIGS. 4A-4B are flowcharts depicting exemplary steps performed by humidity sensor diagnostic modules according to the principles of the present disclosure.

Referring now to FIG. 4A, a flowchart depicting exemplary steps performed by the humidity sensor diagnostic module 240 is presented. Control begins, for example, a predetermined period after the engine 102 is started. In step 402, control resets the total counter and the error counter. Control may reset the counters to a predetermined reset value, such as zero.

Control then proceeds to step 404 where control obtains a measured humidity value. The measured humidity value indicates a humidity of air measured by the humidity sensor 134. For example only, the air may be the air drawn into the engine 102. Control continues in step 406 where control obtains a remote humidity value. The remote humidity value represents an estimated humidity of the air. The remote humidity is provided wirelessly and may be obtained from, for example, the remote data source 248, the radio signal, the cellular signal, the wifi signal, or any other suitable source. For example, the remote data source 248 estimates the humidity of the air based on the vehicle location.

Control then continues in step 408 where control determines whether the remote humidity signal is lost. If so, control returns to step 406; otherwise, control continues to step 410. For example only, control may determine whether the remote humidity signal is lost based on a comparison of the obtained remote humidity value with the predetermined lost signal value, such as 0.0. For example only, control may determine that the remote humidity signal is lost when the remote humidity value is equal to the lost signal value.

In step 410, control increments the total counter. Control then continues in step 412 where control calculates the correlation value. Control calculates the correlation value using the equation:

$$\text{Correlation Value} = |\text{Measured Humidity Value} - \text{Remote Humidity Value}|.$$

Control then proceeds to step 414 where control determines whether the correlation value is greater than the predetermined error value. If so, control continues to step 416; otherwise, control transfers to step 418. For example only, error value may be calibratable, and may be set to a maximum allowable value that may be experienced if the humidity sensor 134 is reliable (i.e., not faulty).

In step 416, control increments the error counter. In this manner, the error counter tracks the number of correlation errors that have occurred. Control continues in step 418 where control determines whether the total counter is greater than or equal to the predetermined total value. If so, control continues to step 420; otherwise, control returns to step 404. For example only, the total value may be set to correspond to a predetermined period of time, such as 30.0 s.

In step 420, control determines whether the error counter is greater than the predetermined fault value. If so, control continues to step 422; otherwise, control transfers to step 424. For example only, the fault value may be set based on the total value, such as one-half of the total value. In step 422, control indicates that a fault has occurred in the humidity sensor 134, and control ends. In step 424, control indicates that no fault has occurred in the humidity sensor 134, and control ends. In this manner, control waits until the total counter is equal to the total value before diagnosing whether a fault has occurred in the humidity sensor 134.

While FIG. 4A shows that control ends after control performs either step 420 or 422, control may instead return to step 402. In this manner, the steps depicted in FIG. 4A may be completed over a predetermined period of time (corresponding to the total counter). In various implementations, the steps of FIG. 4A may be performed once during any given key cycle or continuously while the engine 102 is running.

Figure 4B:
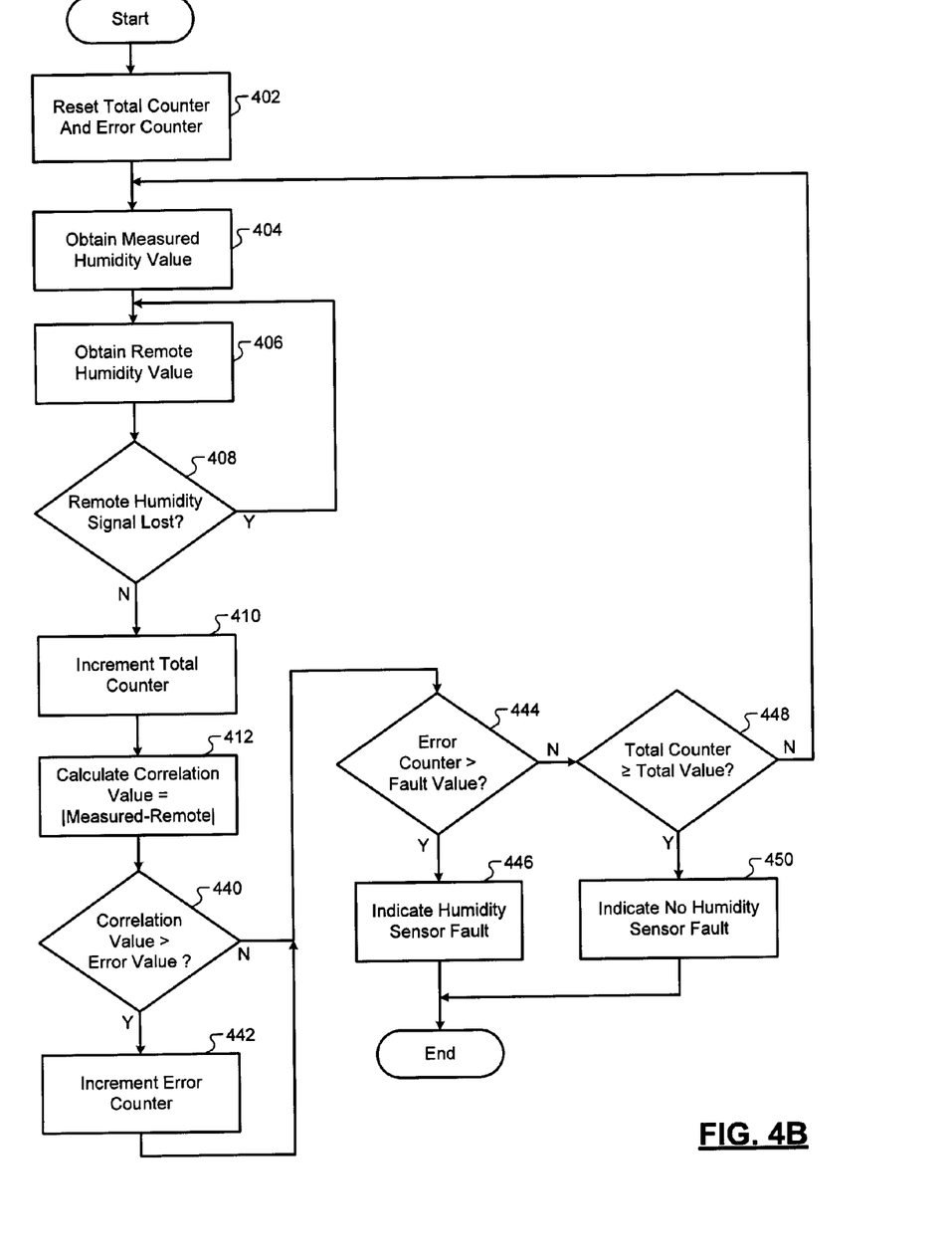

Referring now to FIG. 4B, a flowchart depicting another set of exemplary steps performed by the humidity sensor diagnostic module 240 is presented. Control performs steps 402 through 412 similarly or identically to those steps of FIG. 4A. Control then continues in step 440 where control determines whether the correlation value is greater than the predetermined error value. If so, control continues to step 442; otherwise, control transfers to step 444.

In step 442, control increments the error counter. In step 444, control determines whether the error counter is greater than the fault value. If so, control continues to step 446;

otherwise, control transfers to step 448. In step 446, control indicates a fault has occurred in the humidity sensor 134, and control ends. In this manner control may determine that a fault has occurred before the total counter reaches the total value.

In step 448, control determines whether the total counter is greater than or equal to the total value. If so, control continues to step 450; otherwise, control returns to step 404. In step 450, control indicates that a fault has not occurred, and control ends. In this manner, control may only indicate that a fault has occurred after the total counter reaches the total value. In various implementations, control may continuously determine whether a fault has occurred while the engine 102 is running. In such implementations, control may return to step 404 when the error counter is not greater than the fault value (in step 444). Control may determine the fault value based on, for example, one-half of the total value in such implementations.

Those skilled in the art can now appreciate from the foregoing description that the broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification, and the following claims.

What is claimed is:

1. A diagnostic system for a vehicle comprising;
   a global positioning system (GPS) that monitors a location of said vehicle; and
   a communication module that transmits said location to a data source that is external to the vehicle and that receives humidity data from said data source,
   wherein said data source generates said humidity data based on said location;
   a humidity module that outputs a first humidity value based on a humidity measurement of a humidity sensor of said vehicle and that outputs a second humidity value based on said humidity data from said data source that is external to said vehicle;
   a fault diagnostic module that selectively diagnoses a fault in said humidity sensor based on said first humidity value and said second humidity value; and
   a disable module that prevents said fault diagnostic module from diagnosing said fault when said second humidity value is equal to a second predetermined value.

2. The diagnostic system of claim 1 wherein said humidity data corresponds to an estimate of a humidity measurement based on a second location that is determined based on said location.

3. The diagnostic system of claim 1 wherein said fault diagnostic module selectively diagnoses said fault when a difference between said first and second humidity values is greater than a first predetermined value.

4. A method for a vehicle, comprising:
   monitoring a location of said vehicle;
   transmitting said location to a data source that is external to said vehicle and that generates humidity data based on said location;
   receiving said humidity data from said data source that is external to said vehicle and that generates said humidity data based on said location;
   providing a first humidity value based on a humidity measurement of a humidity sensor of said vehicle;
   providing a second humidity value based on said humidity data from said data source that is external to said vehicle;
   selectively diagnosing a fault in said humidity sensor based on said first humidity value and said second humidity value; and
   preventing said diagnosis when said second humidity value is equal to a second predetermined value.

5. The method of claim 4 wherein said humidity data corresponds to an estimate of a humidity measurement based on a second location that is determined based on said location.

6. The method of claim 4 further comprising diagnosing said fault when a difference between said first and second humidity values is greater than a first predetermined value.

7. A diagnostic system for a vehicle comprising:
   a receiver module that receives a signal from a data source that is external to said vehicle, wherein said signal is one of a wifi signal and a television signal, and wherein humidity data is carried with said signal;
   a humidity module that outputs a first humidity value based on a humidity measurement of a humidity sensor of said vehicle and that outputs a second humidity value based on said humidity data from said data source that is external to said vehicle;
   a fault diagnostic module that selectively diagnoses a fault in said humidity sensor based on said first humidity value and said second humidity value; and
   a disable module that prevents said fault diagnostic module from diagnosing said fault when said second humidity value is equal to a second predetermined value.

8. The diagnostic system of claim 7 wherein said fault diagnostic module selectively diagnoses said fault when a difference between said first and second humidity values is greater than a first predetermined value.

9. The diagnostic system of claim 7 wherein said humidity data is carried on a side band of said signal.

10. A diagnostic method for a vehicle comprising:
    receiving a signal from a data source that is external to the vehicle,
    wherein said signal is one of a wifi signal and a television signal, and
    wherein humidity data is carried with said signal;
    providing a first humidity value based on a humidity measurement of a humidity sensor of said vehicle;
    providing a second humidity value based on said humidity data from said data source that is external to said vehicle;
    selectively diagnosing a fault in said humidity sensor based on said first humidity value and said second humidity value; and
    preventing said diagnosis when said second humidity value is equal to a second predetermined value.

11. The diagnostic method of claim 10 further comprising selectively diagnosing said fault when a difference between said first and second humidity values is greater than a first predetermined value.

12. The diagnostic method of claim 10 wherein said humidity data is carried on a side band of said signal.

* * * * *